(12) United States Patent
Chen et al.

(10) Patent No.: US 9,009,784 B2
(45) Date of Patent: *Apr. 14, 2015

(54) AUTOMATED CORRECTION AND REPORTING FOR DYNAMIC WEB APPLICATIONS

(71) Applicant: International Business Machines Corporation, Armonk, NY (US)

(72) Inventors: Li Chen, Cary, NC (US); John R. Hind, Yongcheng Li, Cary, NC (US); Lun Xiao, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/066,048

(22) Filed: Oct. 29, 2013

(65) Prior Publication Data

US 2014/0059112 A1 Feb. 27, 2014

Related U.S. Application Data

(63) Continuation of application No. 12/131,967, filed on Jun. 3, 2008, now Pat. No. 8,613,039.

(51) Int. Cl.
*G06F 17/00* (2006.01)
*H04L 29/06* (2006.01)
(Continued)

(52) U.S. Cl.
CPC .......... *H04L 67/10* (2013.01); *G06F 17/30893* (2013.01)

(58) Field of Classification Search
USPC ............................................................. 726/1
See application file for complete search history.

(56) References Cited

U.S. PATENT DOCUMENTS 6,598,077 B2 7/2003 Primak et al.
6,605,120 B1 8/2003 Fields et al.
(Continued)

OTHER PUBLICATIONS

United States Patent and Trademark Office, Office Action for U.S. Appl. No. 12/131,967, Jan. 17, 2012, pp. 1-25, Alexandria, VA, USA.

(Continued)

*Primary Examiner* — Kambiz Zand
*Assistant Examiner* — Benjamin Kaplan
(74) *Attorney, Agent, or Firm* — Lee Law, PLLC; Christopher B. Lee (57) ABSTRACT

A run-time application-generated change to dynamic web content, generated during an application run-time by a dynamic web application, is detected in response to user run-time interactions with the dynamic web content rendered by the dynamic web application that changed the dynamic web content during the run-time. The detected run-time application-generated change to the dynamic web content is parsed. The parsed run-time application-generated change to the dynamic web content is compared with web content compliance rules that define specifications for web content representation. A noncompliant element associated with the parsed run-time application-generated change is identified based upon the comparison with the web content compliance rules. A run-time correction of the identified noncompliant element within the dynamic web content changed by the dynamic web application is performed to cause the identified noncompliant element to comply with the web content compliance rules.

20 Claims, 8 Drawing Sheets

(51) Int. Cl.
*H04L 29/08* (2006.01)
*G06F 17/30* (2006.01)

(56) References Cited

U.S. PATENT DOCUMENTS

| | | |
|---|---|---|
| 7,448,023 B2 | 11/2008 | Chory et al. |
| 2006/0143700 A1 | 6/2006 | Herrmann |
| 2006/0195819 A1 | 8/2006 | Chory et al. |

OTHER PUBLICATIONS

United States Patent and Trademark Office, Office Action for U.S. Appl. No. 12/131,967, Sep. 17, 2012, pp. 1-26, Alexandria, VA, USA.

United States Patent and Trademark Office, Notice of Allowance for U.S. Appl. No. 12/131,967, Aug. 7, 2013, pp. 1-8, Alexandria, VA, USA.

Mark Voss, Auto-refreshing dynamic content using AJAX, Webpage/site, May 4, 2006, pp. 1-2, OpenHosting UK Internet Solutions, Published online at: http://www.openhosting.co.uk/articles/webdev/6004.

Ben Caldwell, et al., W3C: Techniques for WCAG 2.0, Specification, Dec. 11, 2007, pp. 1-13, W3C, Published online at: http://www.w3.org/TR/2007/WD-WCAG20-TECHS-20071211/.

Shadi Abou-Zahra, et al., W3C: Web Accessibility Evaluation Tools: Overview, Webpage/site, Mar. 17, 2006, pp. 1-3, W3C, Published online at: http://www.w3.org/WAI/ER/tools/.

Author Unknown, Wikipedia: Representational State Transfer, Webpage/site, Jun. 3, 2008, pp. 1-6, Wikimedia Foundation, Inc., Published online at: http://en.wikipedia.org/wiki/Representational_State_Transfer.

AUTOMATED CORRECTION AND REPORTING FOR DYNAMIC WEB APPLICATIONS

RELATED APPLICATIONS

This application is a continuation of and claims priority to and claims the benefit of U.S. patent application Ser. No. 12/131,967 titled "AUTOMATED CORRECTION AND REPORTING FOR DYNAMIC WEB APPLICATIONS," which was filed in the United States Patent and Trademark Office on Jun. 3, 2008, which has a current status of "Allowed," and which is incorporated herein by reference in its entirety.

BACKGROUND

The present invention relates to systems and methods for identifying and reporting errors associated with dynamic web content. More particularly, the present invention relates to automated correction and reporting for dynamic web applications.

Web servers provide web content that may be displayed on a user's computer. The user displays the web content by navigating to a particular website via entry of a uniform resource locator (URL) into a web browser running on the user's computer. The user may then view and read content associated with the website or interact with the website. The user interactions include clicking buttons, entering text, or other activities.

Certain web content is dynamic in nature, such that the content changes based upon the user's interaction with the content. Dynamic changes to web content are facilitated by execution of scripts or other procedures in response to user interactions with the web content. Javascript® is an example of a scripting language that has been developed to provide dynamic changes to web content.

BRIEF SUMMARY

The subject matter described herein provides automated runtime checking, correction, and reporting of accessibility problems for dynamic rich web applications. Compliance rules identify proper organization and formatting for web site content. Dynamic changes to the web site content are monitored in runtime as the dynamic changes occur. Noncompliant tags and attributes associated with the dynamic changes are identified based upon the compliance rules. Automated correction of the identified noncompliant tags and attributes facilitates functional correction of the web site content during the present session. Report generation and forwarding to source development servers provides developer feedback for the identified noncompliant tags and attributes. The report identifies the event that triggered the dynamic changes, the identified noncompliant tags and attributes, and the automated correction performed during the present session. Accordingly, accessibility problems are automatically corrected in runtime and future deployments of dynamic web site content may be improved via the feedback reporting generated.

A method includes monitoring changes to dynamic web content for compliance with web content compliance rules, identifying a noncompliant element associated with a change to the dynamic web content based upon the web content compliance rules, performing automated correction of the noncompliant element based upon the web content compliance rules, and reporting the noncompliant element to a server associated with the change to the dynamic web content.

A system includes a memory adapted to store web content compliance rules, and a computing device adapted to monitor changes to dynamic web content for compliance with the web content compliance rules, identify a noncompliant element associated with a change to the dynamic web content based upon the web content compliance rules, perform automated correction of the noncompliant element based upon the web content compliance rules, and report the noncompliant element to a server associated with the change to the dynamic web content.

An alternative system includes a database adapted to store web content compliance rules, a memory adapted to store at least one of a document object model and markup language representing dynamic web content, and a computing device adapted to monitor changes to the dynamic web content for compliance with the web content compliance rules, identify a noncompliant element associated with a change to the dynamic web content based upon the web content compliance rules and a change to the at least one of the document object model and the markup language, determine that an error associated with the noncompliant element comprises at least one of an improper tag, a missing tag, an improper attribute, a missing attribute, an improper attribute value, and a missing attribute value, identify event information associated with the noncompliant element, perform automated correction of the noncompliant element based upon the web content compliance rules to correct the at least one of the document object model representation and the markup language representation of the dynamic web content within the memory, and report the noncompliant element and the event information to a server associated with the change to the dynamic web content.

A computer program product includes a computer useable medium including a computer readable program. The computer readable program when executed on a computer causes the computer to monitor changes to dynamic web content for compliance with web content compliance rules, identify a noncompliant element associated with a change to the dynamic web content based upon the web content compliance rules, perform automated correction of the noncompliant element based upon the web content compliance rules, and report the noncompliant element to a server associated with the change to the dynamic web content.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated runtime checking, correction, and reporting of accessibility problems for dynamic rich web applications. Compliance rules identify proper organization and formatting for web site content. Dynamic changes to the web site content are monitored in runtime as the dynamic changes occur. Noncompliant tags and attributes associated with the dynamic changes are identified based upon the compliance rules. Automated correction of the identified noncompliant tags and attributes facilitates functional correction of the web site content during the present session. Report generation and forwarding to source development servers provides developer feedback for the identified noncompliant tags and attributes. The report identifies the event that triggered the dynamic changes, the identified noncompliant tags and attributes, and the automated correction performed during the present session. Accordingly, accessibility problems are automatically corrected in runtime and future deployments of dynamic web site content may be improved via the feedback reporting generated.

For purposes of the present description runtime shall include any time frame of sufficiently short duration as to provide reasonable response time for identification and correction of problems associated with dynamic web site content acceptable to a user of the subject matter described. Additionally, the terms accessibility and web accessibility as used herein refer to capabilities within a web-based system or application that allow people with disabilities to perceive, understand, navigate, interact with, and contribute to the web or other networked infrastructure independent of the reason for the disability.

Figure 1:
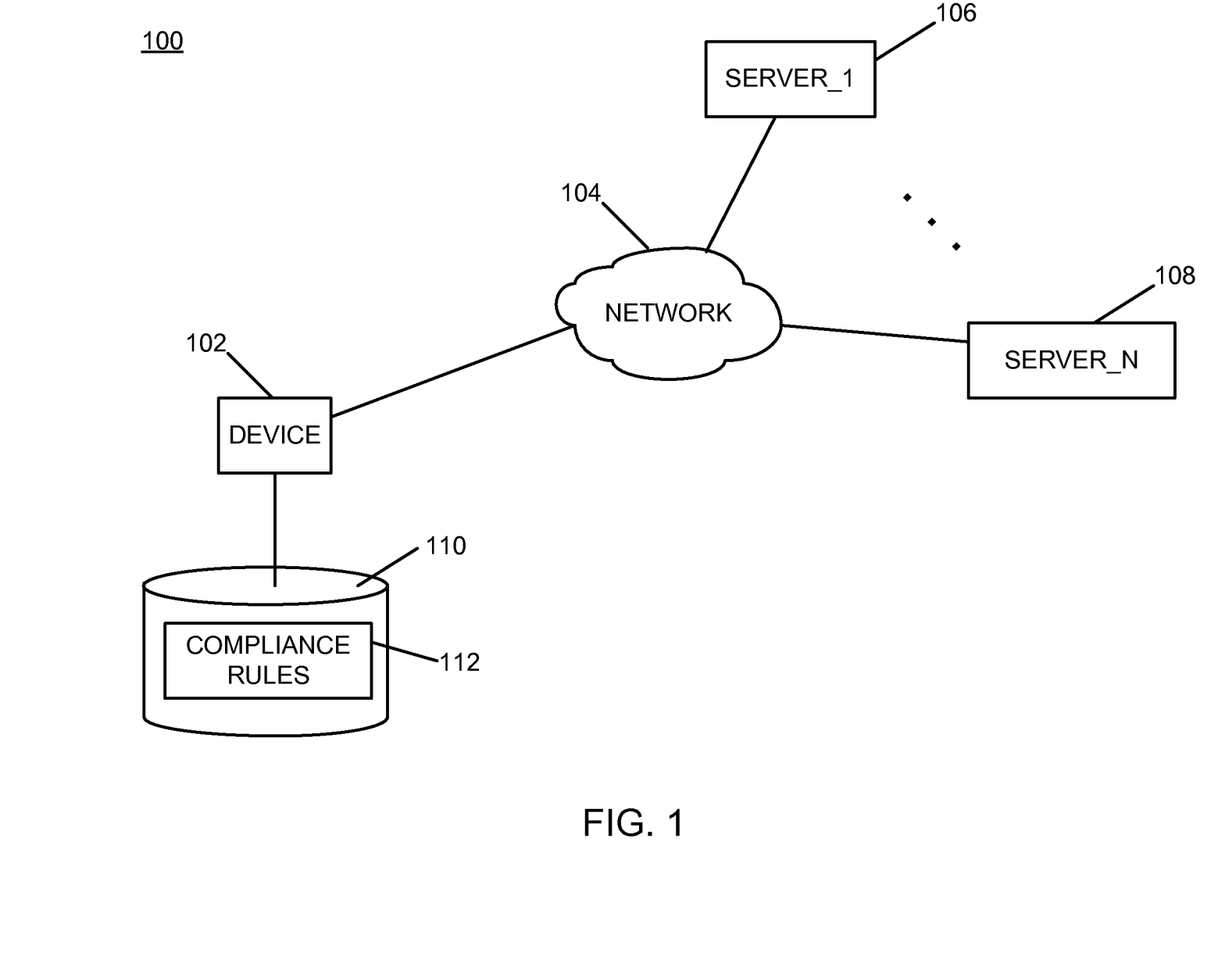
FIG. 1 illustrates an example of an implementation of a block diagram of a system for automated correction and reporting for dynamic web applications according to an embodiment of the present subject matter.

FIG. 1 illustrates an example of an implementation of a block diagram of a system 100 for automated correction and reporting for dynamic web applications. Within the system 100, a computing device 102 is illustrated interconnected via a network 104 to a server_1 106 through a server_N 108. The computing device 102 provides for correction and reporting for dynamic web applications in response to interactions with dynamic web content performed by a user of the computing device 102. The server_1 106 through the server_N 108 provide dynamic web content accessible by the user of the computing device 102 via the network 104.

It should be noted that the computing device 102 may be any computing device capable of processing information as described above and in more detail below. For example, the computing device 102 may include devices such as a personal computer, a cellular telephone, a personal digital assistance (PDA), an email device, a music recording or playback device, or any other device capable of processing information as described in more detail below. Additionally, the computing device 102 may be co-located or distributed geographically with respect to the any of the server_1 106 through the server_N 108, and the network 104. The network 104 includes any form of interconnection suitable for the intended purpose, including a private or public network such as an intranet or the Internet, respectively, direct inter-module interconnection, or any other interconnection mechanism capable of interconnecting the devices.

A database 110 is associated with the computing device 102 and provides storage capabilities for information associated with the automated correction and reporting for dynamic web applications of the present subject matter. The database 110 includes a set of compliance rules 112 that may be stored in the form of a table or other arrangement accessible by the computing device 102. The compliance rules 112 include structural, syntactic, formatting, or other requirements for web content presented to a user of a web-based system, such as the system 100. The compliance rules 112 may include rules associated with accessibility aspects of dynamic web content in addition to rules associated with functionality of the dynamic web content. Accordingly, the compliance rules 112 establish a reference against which changes to dynamic web content may be measured for compliance with structural, syntactic, formatting, functionality, accessibility, and other requirements for web content.

As will be described in more detail below, the computing device 102 monitors changes to dynamic web content in runtime as the changes occur. The computing device 102 compares changes to dynamic web content with the compliance rules 112, identifies errors with rendered content, performs automated correction of the rendered content, generates reports including the content error and associated event information (e.g., mouse click on a particular content element), and forwards the report to a server, such as the server_1 106, that is associated with the dynamic web content. A developer of the dynamic web content may then utilize the report to programmatically correct the dynamic web content and deploy a new revision of the dynamic web content.

The compliance rules 112 may be updated periodically by any of the server_1 106 through the server_N 108 to accommodate new measurement criteria for new dynamic web content as dynamic web content evolves over time. As such, developers associated with the server_1 106 through the server_N 108 may develop new dynamic web content and distribute compliance rules via the network 104 for runtime monitoring of the new dynamic web content by the computing device 102. Accordingly, the developers may deploy compliance rules for storage as a portion of the compliance rules 112 associated with any computing device 102 accessible on the network 104. In this manner, developers may utilize computing devices configured as described above and in more detail below as the computing device 102 to form a distributed compliance checking, error correcting, and reporting infrastructure.

Figure 2:
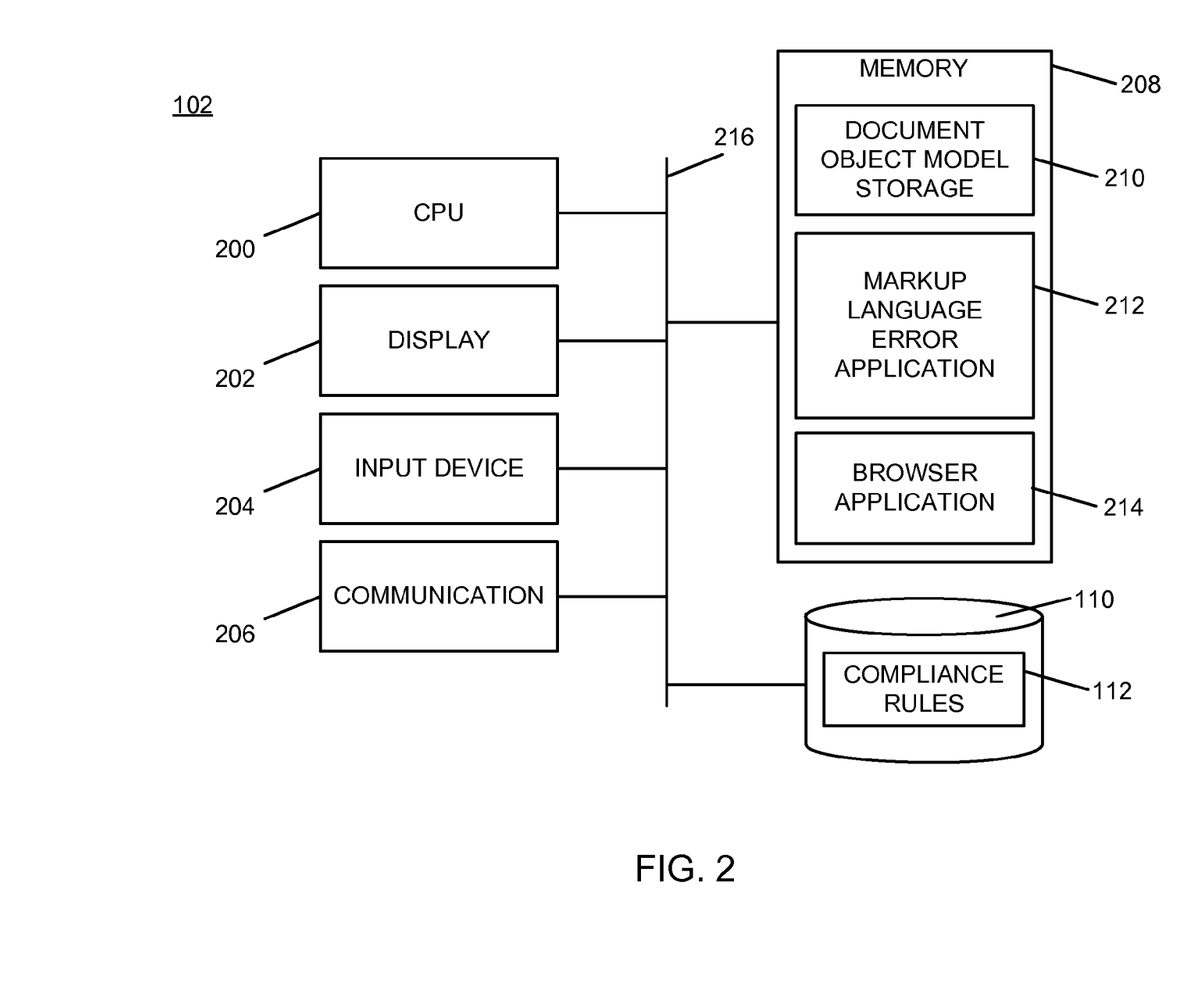
FIG. 2 illustrates an example of an implementation of a block diagram of the computing device that is capable of performing automated correction and reporting for dynamic web applications according to an embodiment of the present subject matter.

FIG. 2 illustrates an example of an implementation of a block diagram of the computing device 102 that is capable of performing automated correction and reporting for dynamic web applications. A central processing unit (CPU) 200 provides computer instruction execution, computation, and other capabilities within the computing device 102. A display 202 provides visual information to a user of the computing device 102 and an input device 204 provides input capabilities for the user.

The input device 204 may include a computer keyboard, a keypad, a mouse, a pen, a joystick, or any other type of input device by which the user may interact with dynamic web content represented on the display 202. Events associated with changes to dynamic web content, such as a mouse click to a content element, may be initiated by a user interaction with the input device 204. These events may be tracked and reported by the computing device 102 to the associated content developer server, such as the server_1 106.

A communication module 206 provides interconnection capabilities that allow the computing device 102 to communicate with other modules within the system 100, such as the server_1 106 through the server_N 108. The communication module 206 may include any electrical, protocol, and protocol conversion capabilities useable to provide the interconnection capabilities.

A memory 208 includes a document object model storage area 210 that stores a representation of the presently-accessed web content. The memory 208 also includes a markup language error application 212 and a browser application 214. The markup language error application 212 includes capabilities for runtime monitoring of changes to dynamic web content, identification of errors in the changes, correction of the errors, generation of reports, and high-level communication interactions with other nodes within the system 100, such as the server_1 106, for reporting the identified and corrected errors. The markup language error application 212 includes instructions executable by the CPU 200 for performing these functions.

The markup language error application 212 may form a portion of an interrupt service routine (ISR), a portion of an operating system, a portion of the browser application 214, or a portion of a separate application without departure from the scope of the present subject matter. The markup language error application 212 may also process rules from the compliance rules 112 to perform these activities. The browser application 214 accesses and retrieves content from a server, such as the server_1 106, and presents that content to a user of the computing device 102 via the display 202.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area suitable for storage of the document object model storage area 210, and storage and execution of the markup language error application 212 and the browser application 214.

The CPU 200, the display 202, the input device 204, the communication module 206, the memory 208, and the database 110 are interconnected via an interconnection 216. The interconnection 216 may include a system bus, a network, or any other interconnection capable of providing the respective components with suitable interconnection for the respective purpose.

Furthermore, components within the computing device 102 may be co-located or distributed within a network without departure from the scope of the present subject matter. For example, the components within the computing device 102 may be located within a stand-alone device, such as a personal computer (e.g., desktop or laptop) or handheld device (e.g., cellular telephone, personal digital assistant (PDA), email device, music recording or playback device, etc.). For a distributed arrangement, the display 202 and the input device 204 may be located at a terminal of a fuel pump, point of sale device, or kiosk, while the CPU 200 and memory 208 may be located at a local or remote server. Many other possible arrangements for components of the computing device 102 are possible and all are considered within the scope of the present subject matter. It should also be understood that, though the compliance rules 112 are shown within the database 110, they may also be stored within the memory 208 without departure from the scope of the present subject matter.

The examples presented below use markup language error identification and correction for ease of illustration purposes. However, it is understood that the present subject matter is not limited to markup language processing and that processing of any other form of rendered content may be performed without departure from the scope of the present subject matter.

FIGS. 3 through 6 illustrate an example of an implementation of a time progression for dynamic web content stored within the document object model storage area 210. The elements stored within the document object model storage area 210 represent the dynamic web content presented to a user of the computing device 102 on the display 202 by the browser application 214 over time as the user interacts with the dynamic web content. The time progression illustrates changes to the dynamic web content based upon user manipulation of the input device 204. The time progression illustrated within FIGS. 2 through 6 is provided to facilitate understanding of the automated correction and reporting for dynamic web applications associated with the present subject matter. Detailed examples of processes for automated correction and reporting for dynamic web applications are presented below beginning with FIG. 7.

Figure 3:
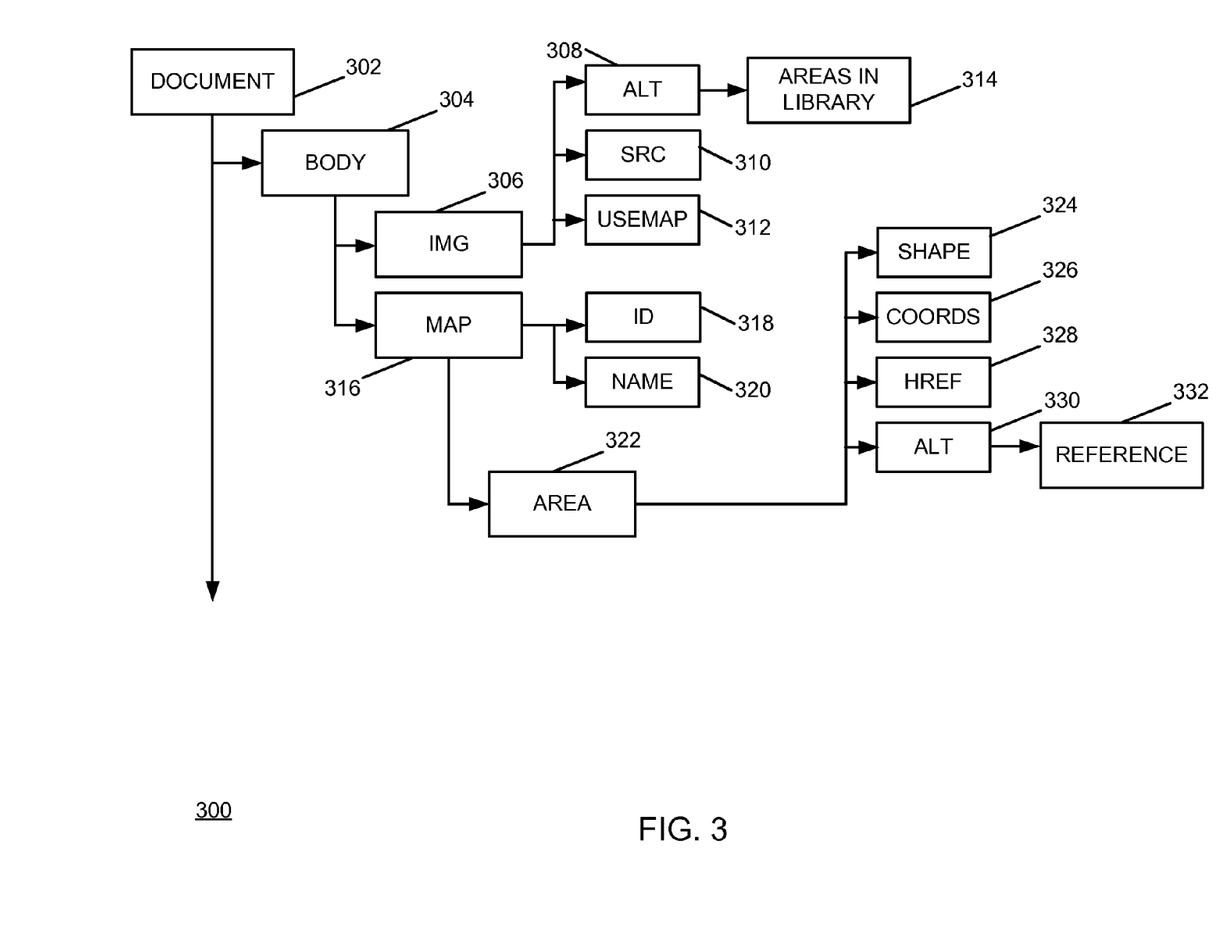
FIG. 3 illustrates an example of an implementation of a document object model in an initial state prior to any changes to dynamic web content according to an embodiment of the present subject matter.

FIG. 3 illustrates an example of an implementation of a document object model 300 in an initial state prior to any changes to dynamic web content. As described above, the document object model 300 is stored within the document object model storage area 210 of the memory 208. The following markup language pseudo code is presented in a hypertext markup language (HTML) format as an example markup language for ease of illustration purposes. Additional example markup languages include extensible markup language (XML) and standard generalized markup language (SGML). Many other markup languages exist and all are considered within the scope of the present subject matter. The markup language pseudo code shown below represents web content that may be used to render the document object model 300 in its initial state as illustrated within FIG. 3.

```
<html> <body>
<img src="welcome.gif" usemap="#map1" alt="areas in library"/>
<map id="map1" name="map1">
<area shape="rect" coords="0,0,30,30" href="reference.html"
alt="Reference"/>
</map> </body> </html>
```

With reference to FIG. 3, this example markup language pseudo code generated several elements within the document object model 300. Though distinctions are made between objects, attributes, attribute values, and tags within the following description for purposes of clarity, they may all be considered as elements associated with dynamic web content for purposes of the present description. A document object 302 represents the highest level element within the hierarchy of the document object model 300 and is created by the "<html>" and "</html>" tag pair within the example markup language pseudo code. A body object 304 represents the next element within the hierarchy of the document object model 300 and is created by the "<body>" and "</body>" tag pair within the example markup language pseudo code.

An img object 306 represents the first element within the body hierarchy of the document object model 300 and is created by the "<img . . . />" tag within the example markup language pseudo code. The img object 306 includes an alt attribute 308, a src attribute 310, and a usemap attribute 312. As can be seen from the example markup language pseudo code above, each of the alt attribute 308, the src attribute 310, and the usemap attribute 312 has an attribute value associated with it. The attribute value of the alt attribute 308 is a text string "areas in library." The attribute value of the src attribute 310 is a file name for a graphic file named "welcome.gif." The attribute value of the usemap attribute 312 is a value of "#map1" which is an internal reference as described in more detail below. For ease of illustration, only the value of the alt attribute 308 is illustrated within FIG. 3. An attribute value 314 stores the value of the alt attribute 308.

A map object 316 represents the second element within the body hierarchy of the document object model 300 and is created by the "<map>" and "</map>" tag pair within the example markup language pseudo code. The map object 316 includes an id attribute 318 and a name attribute 320. The attribute value of the id attribute 318 and the name attribute 320 is each set to "map1" and forms the reference described above in association with the usemap attribute 312. For ease of illustration, the attribute values for the id attribute 318 and the name attribute 320 are not illustrated within FIG. 3.

The markup language pseudo code for the map object 316 also includes syntax that creates an area object 322 located between the starting and ending map tags. The area object 322 includes a shape attribute 324, a coords attribute 326, an href attribute 328, and an alt attribute 330.

As can be seen from the example markup language pseudo code above, each of the shape attribute 324, the coords attribute 326, the href attribute 328, and the alt attribute 330 has an attribute value associated with it. The attribute value of the shape attribute 324 is a value of "rect" representing that the area object 322 is rectangular in shape. The attribute value of the coords attribute 326 is a value of "0,0,30,30" setting up coordinates for display of content associated with the area object 322. The attribute value of the href attribute 328 is a value of "reference.html" which identifies a file name associated with the content for the href attribute 328. The attribute value of the alt attribute 330 is a value of "reference." For ease of illustration, only the value of the alt attribute 330 is illustrated within FIG. 3. An attribute value 332 stores the value of the alt attribute 330. When the user places a cursor associated with the input device 204 and the display 202 over the area object 322, the text of "reference" may be displayed within a pop up dialog.

Figure 4:
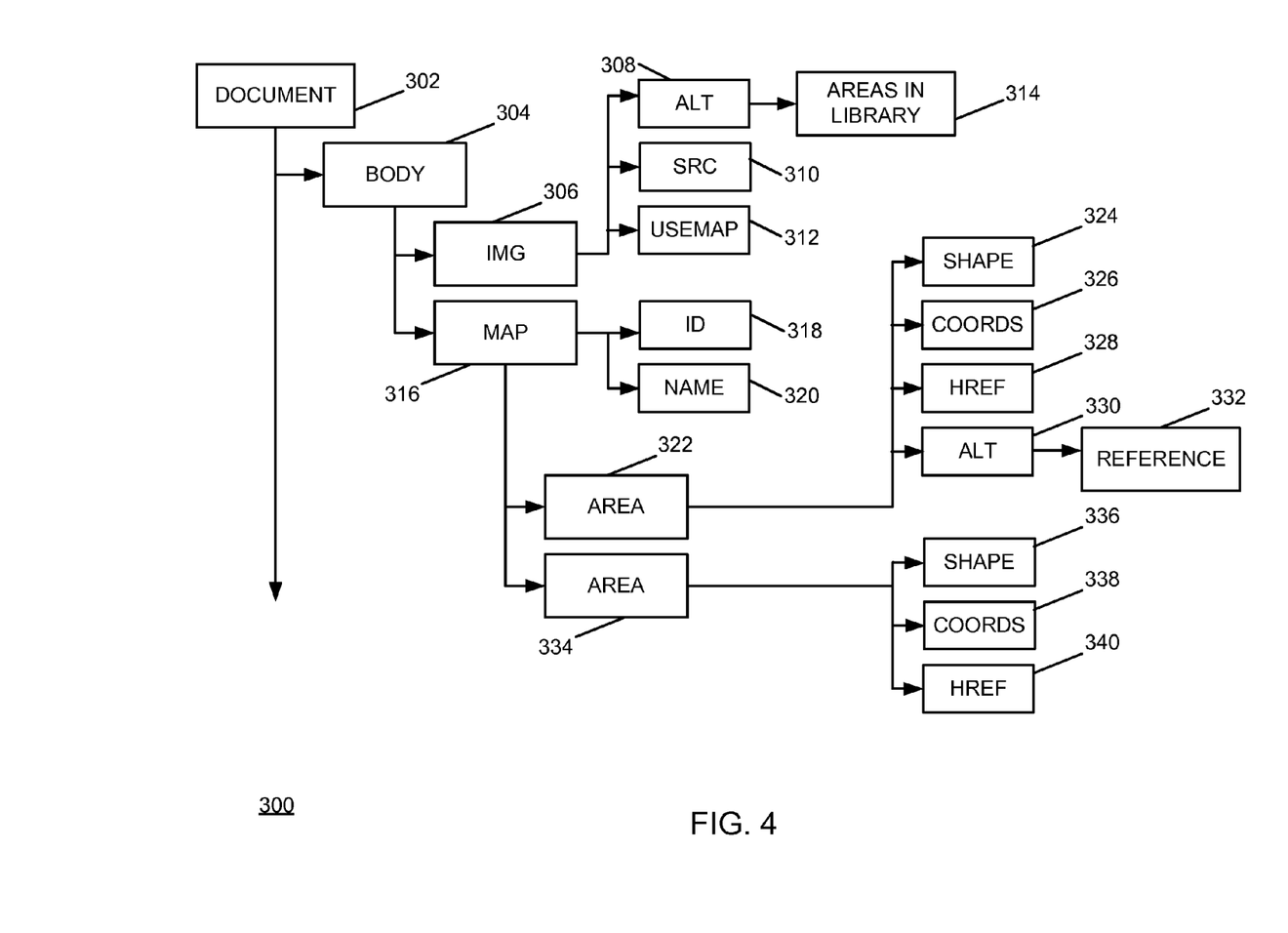
FIG. 4 illustrates an example of an implementation of a document object model after the user has selected an element associated with the document object model with an input device that resulted in generation of dynamic web content that includes an error according to an embodiment of the present subject matter.

FIG. 4 illustrates an example of an implementation of the document object model 300 after the user has selected an element associated with the document object model 300 with the input device 204 that resulted in generation of dynamic web content that includes an error. It should be understood that many sources of errors with dynamic web content exist. For example, server side applications, such as hypertext preprocessor embedded scripting language (PHP), active server pages (ASP), Java server pages (JSP), representational state transfer application programming interface (REST API), and client side scripts, plug-ins, and ActiveX controls may all cause errors with dynamic web content.

For purposes of the present example, it is assumed that a button was present on the web page and was clicked by the user and that this button was associated with an element represented within the document object model 300. The result of clicking the button caused the following first pseudo code script to execute.

```
function addArea( ) {
    get the root of the DOM document;
    find the 'map' object under root;
    add an 'area' object under the 'map' object;
    add a 'shape' attribute under the 'area' object;
    add a 'coords' attribute under the 'area' object;
    add a 'href' attribute under the 'area' object.
}
```

In response to execution of this first pseudo code script, the following first modification markup language pseudo code represents the example markup language pseudo code described above after changes caused by execution of the first pseudo code script. As will be described in more detail below, the changes shown within the following first modification markup language pseudo code also generate changes to the document object model 300 illustrated within FIG. 4.

```
<html> <body>
<img src="welcome.gif" usemap="#map1" alt="areas in library"/>
<map id="map1" name="map1">
<area shape="rect" coords="0,0,30,30" href="reference.html"
alt="reference"/>
<area shape="rect" coords="34,34,100,100" href="media.html"/>
</map> </body> </html>
```

As can also be seen from this example first modification markup language pseudo code, there is no alt attribute associated with the new area object represented within the pseudo code. A detailed discussion of the various components of the first modification markup language pseudo code is omitted for brevity and reference is made to the description above for understanding of the various components of this example.

With reference to FIG. 4, in response to the changes made to the first modification markup language pseudo code generated in response to execution of the first pseudo code script, a new area object 334 has been created within the document object model 300. The area object 334 includes a shape attribute 336, a coords attribute 338, and an href attribute 340. As can be seen from FIG. 4, there is not an alt attribute associated with the area object 334 and, as described above, this is the error associated with the dynamic web content in the present example.

Figure 5:
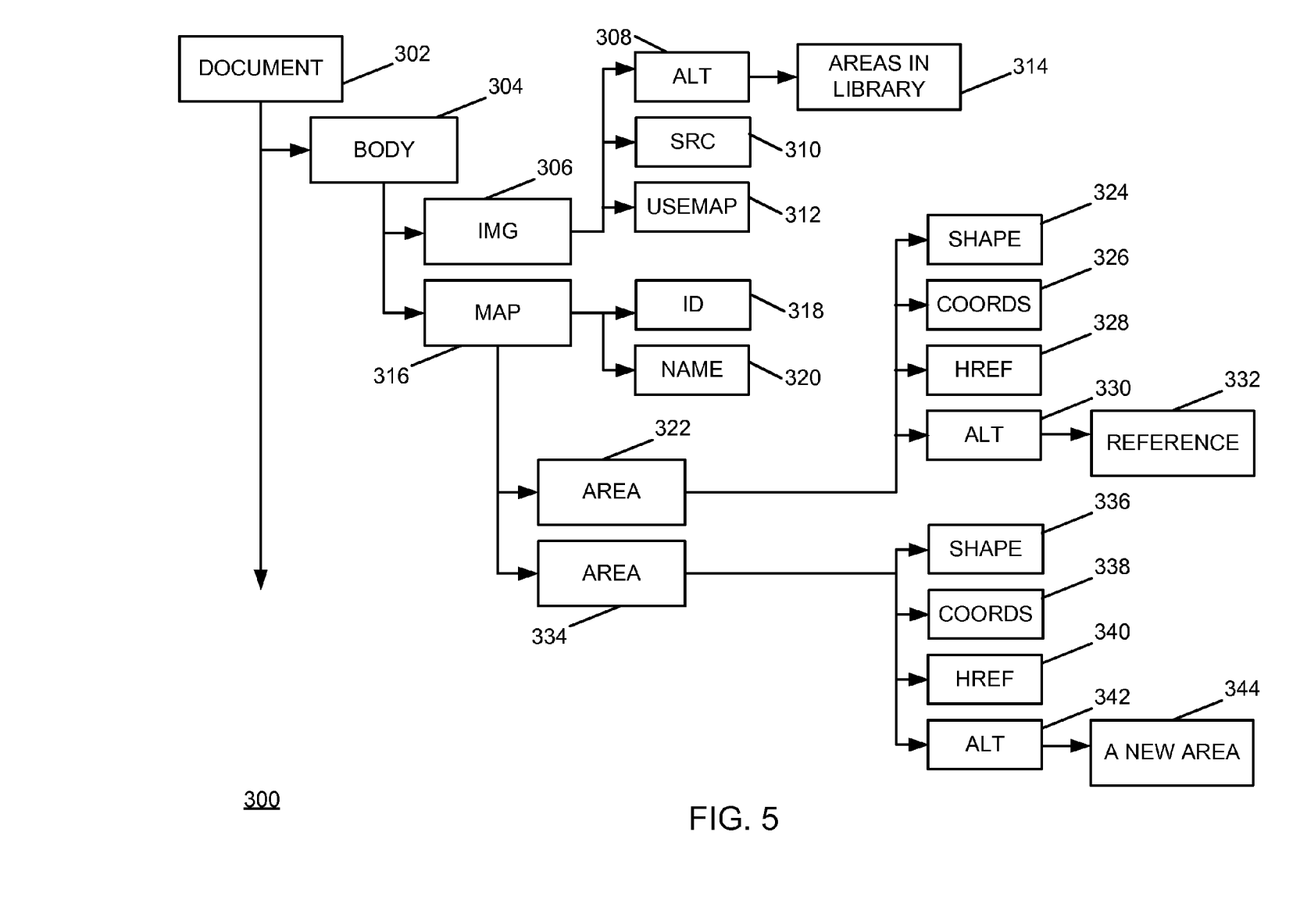
FIG. 5 illustrates an example of an implementation of a document object model after a computing device executing a markup language error application has corrected an error associated with the document object model according to an embodiment of the present subject matter.

FIG. 5 illustrates an example of an implementation of the document object model 300 after the computing device 102 executing the markup language error application 212 has corrected the error associated with the document object model 300. As described above and in more detail below beginning with FIG. 7, the markup language error application 212 performs runtime monitoring of changes to dynamic web content. The markup language error application 212 parses changes to the dynamic web content and compares the changes to structural, syntactic, formatting, functionality, accessibility, and other requirements for web content represented by the compliance rules 112 to detect and identify noncompliant elements associated with the changes. An example rule associated with the present example is represented within the following pseudo rule syntax. Other rule syntaxes and formats are possible and all are considered within the scope of the present subject matter.

```
For each area object {
    Verify that the area object has an alt attribute.
    Verify that the text alternative specified by the alt
        attribute is associated with
        the related map object. }
```

The markup language error application 212 corrects the noncompliant element based upon the compliance rules 112, such as by use of the example pseudo rule syntax presented above, by creating an alt attribute and associated text for the new area object represented above within the first modification markup language pseudo code. The markup language error application 212 reports the error to a server, such as the server_1 106, associated with the change to the dynamic web content by causing the computing device 102 to send a report message to the server. The report message provides information associated with the error to developers so that future deployments of the dynamic web content may be improved.

The following second modification markup language pseudo code represents changes made to the first modification markup language pseudo code in response to the markup language error application 212 correcting the error with the first modification markup language pseudo code based upon the compliance rules 112.

```
<html> <body>
<img src="welcome.gif" usemap="#map1" alt="areas in library"/>
<map id="map1" name="map1">
<area shape="rect" coords="0,0,30,30" href="reference.html"
alt="reference"/>
<area shape="rect" coords="34,34,100,100" href="media.html"
alt="a new area"/>
</map> </body> </html>
```

In response to the modifications represented within the second modification markup language pseudo code, the document object model 300 is modified within the document object model storage area 210 in the memory 208. As can be seen from FIG. 5, an alt attribute 342 has been added to the document object model 300. An attribute value 344 stores a default value of "a new area" for the alt attribute 342.

Figure 6:
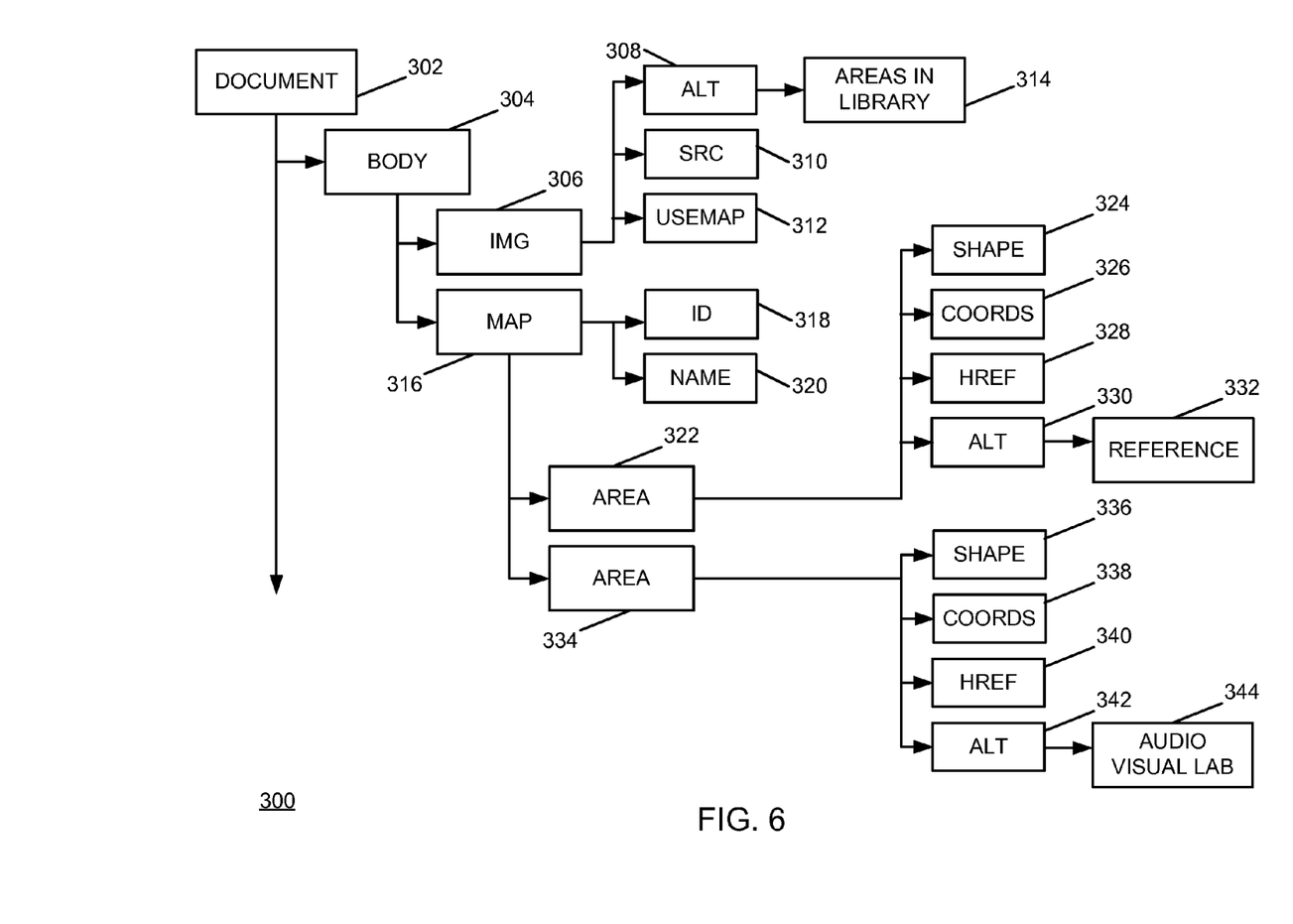
FIG. 6 illustrates an example of an implementation of a document object model after a web site developer has corrected an application that generated an error such that a document object model is rendered in memory without error in response to the same user interaction associated with FIG. 4 above according to an embodiment of the present subject matter.

FIG. 6 illustrates an example of an implementation of the document object model 300 after a web site developer has corrected the application that generated the error such that the document object model 300 is rendered within the memory 208 without error in response to the same user interaction associated with FIG. 4 above. In response to the error report sent by the computing device 102, developers associated with the dynamic web content may generate a new release of dynamic web content, such as that represented within the following second pseudo code script.

```
function addArea() {
    get the root of the DOM document;
    find the 'map' object under root;
    add an 'area' object under the 'map' object;
    add a 'shape' attribute under the 'area' object;
    add a 'coords' attribute under the 'area' object;
    add a 'href' attribute under the 'area' object;
    add a 'alt' attribute with value 'audio visual lab' under the 'area' object.
}
```

The following third modification markup language pseudo code represents the code generated by the second pseudo code script after execution in response to the same event that caused execution of the first pseudo code script described above.

```
<html> <body>
<img src="welcome.gif" usemap="#map1" alt="areas in library"/>
<map id="map1" name="map1">
<area shape="rect" coords="0,0,30,30" href="reference.html"
alt="reference"/>
<area shape="rect" coords="34,34,100,100" href="media.html"
alt="audio visual lab"/>
</map> </body> </html>
```

In response to the modifications represented within the third modification markup language pseudo code, the document object model 300 is modified within the document object model storage area 210 in the memory 208. As can be seen from FIG. 6, an attribute value 344 stores a new value of "audio visual lab" for the alt attribute 342. Accordingly, when the user places a cursor associated with the input device 204 and the display 202 over the area object 334, the text of "audio visual lab" may be displayed within a pop up dialog.

As described above in association with FIGS. 3 through 6, the computing device 102 monitors changes to dynamic web content, detects and identifies noncompliant elements based upon the compliance rules 112, performs automated correction of rendered output, and reports information associated with the error to a server associated with the change to the dynamic web content. Many additional operations associated with monitoring changes to dynamic web content are possible. For example, logging of error reports, tracking frequency of errors reported in association with specific developer servers, and many other operations are possible. Accordingly, all such additional operations are considered to be within the scope of the present subject matter.

Figure 7:
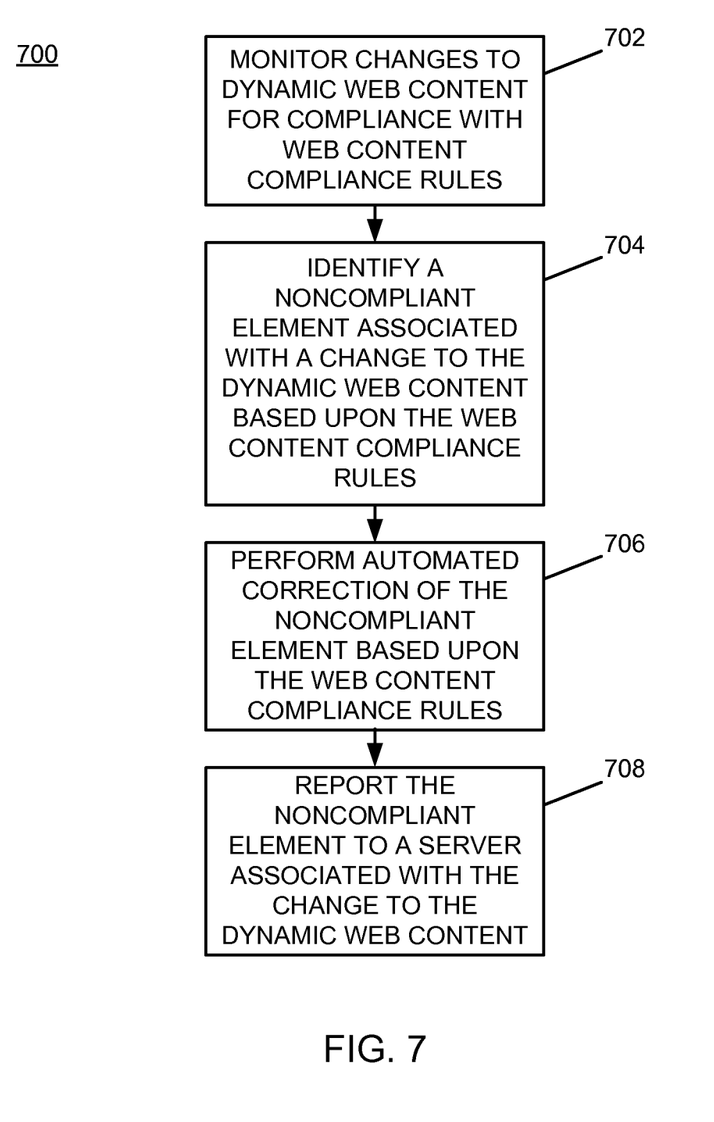
FIG. 7 illustrates an example of an implementation of a process for performing automated correction and reporting for dynamic web applications according to an embodiment of the present subject matter.

FIG. 7 illustrates an example of an implementation of a process 700 for performing automated correction and reporting for dynamic web applications. At block 702, the process 700 monitors changes to dynamic web site content for compliance with web content compliance rules. For example, the process 700 may monitor the results of any script that executes in association with dynamic web content. At block 704, the process 700 identifies a noncompliant element associated with a change to the dynamic web content based upon the web content compliance rules. For example, the process 700 may identify an improper tag, a missing tag, an improper attribute, a missing attribute, an improper attribute value, and a missing attribute value.

At block 706, the process 700 performs automated correction of the noncompliant element based upon the web content compliance rules. For example, the process 700 may modify markup language code to add a default entry for the improper tag, the missing tag, the improper attribute, the missing attribute, the improper attribute value, or the missing attribute value. At block 708, the process 700 reports the noncompliant element to a server associated with the change to the dynamic web content. For example, the process 700 may report the error by sending an email message to an email address associated with a webmaster for a website using the uniform resource locator (URL) for the site that originated the dynamic web content (e.g., webmaster@domain.com). Many other forms of messaging are possible and all are considered within the scope of the present subject matter. The report may further include any information associated with the error, such as an identification of the script that executed and the user interface event that triggered execution of the script.

Figure 8:
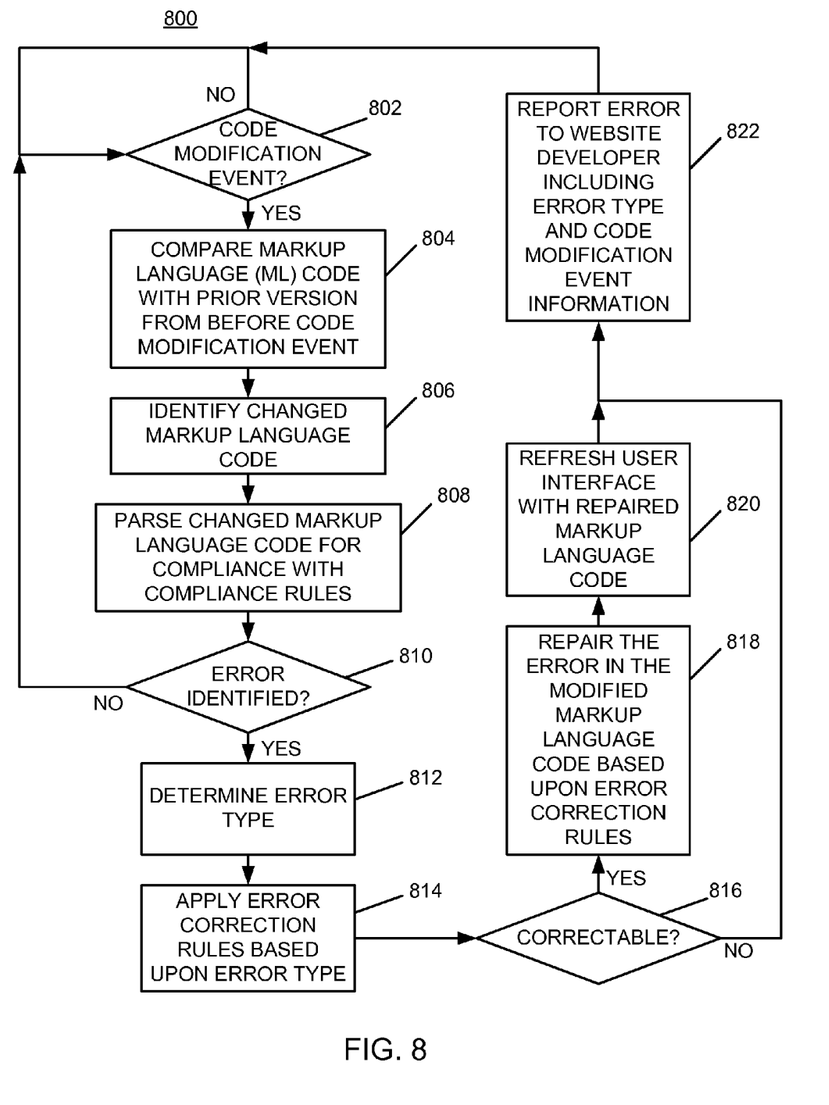
FIG. 8 illustrates an example of an implementation of a process for performing automated monitoring, error identification, error correction, and reporting for dynamic web applications according to an embodiment of the present subject matter.

FIG. 8 illustrates an example of an implementation of a process 800 for performing automated monitoring, error identification, error correction, and reporting for dynamic web applications. The process 800 waits for a markup language code modification event at decision point 802. In response to a code modification event, the process 800 compares markup language (ML) code with a prior version from before the code modification event at block 804. At block 806, the process 800 identifies changed markup language code. The process 800 parses the changed markup language code for compliance with compliance rules, such as the compliance rules 112, at block 808.

At decision point 810, the process 800 makes a determination as to whether an error was identified within the changed markup language code. When a determination is made that an error was not identified, the process 800 returns to decision point 802 to await another markup language code modification event.

When a determination is made at decision point 810 that an error was identified within the changed markup language code, the process 800 determines the error type at block 812. For purposes of the present example, the error type may be a tag error type associated with an improper or missing tag, at attribute error type associated with an improper or missing attribute, or an attribute value error type associated with an improper or missing attribute value.

At block 814, the process 800 applies error correction rules based upon the determined error type. The error correction rules may be the compliance rules 112 or a variation of the compliance rules 112 categorized by error type within a separate table within the database 110 or the memory 208.

At decision point 816, the process 800 makes a determination as to whether the error is correctable based upon the error correction rules. When a determination is made that the error is correctable, the process 800 repairs the error in the modified markup language code based upon the error correction rules at block 818 and refreshes the user interface with the repaired markup language code at block 820.

When a determination is made that the error is not correctable at decision point 816 or after the user interface is refreshed at block 820, the process 800 reports the error to the website developer including error type and code modification event information associated with the change to the dynamic web content at block 822.

As described above in association with FIGS. 1 through 8, the example systems and processes provide automated monitoring, error identification, error correction, and reporting for dynamic web applications. Many other variations and additional activities associated with automated monitoring, error identification, error correction, and reporting for dynamic web applications are possible and all are considered within the scope of the present subject matter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:
1. A method, comprising:
 detecting a run-time application-generated change to dynamic web content that is generated during an application run-time by a dynamic web application in response to user run-time interactions with the dynamic web content rendered by the dynamic web application that changed the dynamic web content during the run-time;
 parsing the detected run-time application-generated change to the dynamic web content;

comparing the parsed run-time application-generated change by the dynamic web application to the dynamic web content with web content compliance rules that define specifications for web content representation;

identifying a noncompliant element associated with the parsed run-time application-generated change by the dynamic web application to the dynamic web content based upon the comparison with the web content compliance rules; and performing a run-time correction of the identified noncompliant element within the dynamic web content changed by the dynamic web application to cause the identified noncompliant element to comply with the web content compliance rules.

2. The method of claim 1, where the specifications for the web content representation defined within the web content compliance rules comprise a plurality of specifications selected from a group consisting of:

structural, syntactic, formatting, functionality, and accessibility markup language specifications defined for the web content representation.

3. The method of claim 1, where the specifications for the web content representation defined within the web content compliance rules capture attribute associations between elements of the dynamic web content.

4. The method of claim 1, further comprising tracking frequency of noncompliant element errors reported in association with specific developer servers.

5. The method of claim 4, further comprising documenting the tracked frequency of the noncompliant element errors reported in association with the specific developer servers within logging error reports.

6. The method of claim 1, further comprising:

receiving, in response to generation of a report comprising the identified noncompliant element and the run-time correction of the identified noncompliant element, a generated new release of the dynamic web content; and providing the generated new release of the dynamic web content within the application run-time.

7. The method of claim 1, where performing the run-time correction of the identified noncompliant element within the dynamic web content changed by the dynamic web application to cause the identified noncompliant element to comply with the web content compliance rules comprises:

applying at least one error correction rule based upon an error type associated with the identified noncompliant element associated with the parsed run-time application-generated change by the dynamic web application to the dynamic web content.

8. A system, comprising:

a memory adapted to store web content compliance rules; and a processor programmed to:

detect a run-time application-generated change to dynamic web content that is generated during an application run-time by a dynamic web application in response to user run-time interactions with the dynamic web content rendered by the dynamic web application that changed the dynamic web content during the run-time;

parse the detected run-time application-generated change to the dynamic web content;

compare the parsed run-time application-generated change by the dynamic web application to the dynamic web content with the web content compliance rules that define specifications for web content representation;

identify a noncompliant element associated with the parsed run-time application-generated change by the dynamic web application to the dynamic web content based upon the comparison with the web content compliance rules; and perform a run-time correction of the identified noncompliant element within the dynamic web content changed by the dynamic web application to cause the identified noncompliant element to comply with the web content compliance rules.

9. The system of claim 8, where the specifications for the web content representation defined within the web content compliance rules comprise a plurality of specifications selected from a group consisting of:

structural, syntactic, formatting, functionality, and accessibility markup language specifications defined for the web content representation.

10. The system of claim 8, where the specifications for the web content representation defined within the web content compliance rules capture attribute associations between elements of the dynamic web content.

11. The system of claim 8, where the processor is further programmed to:

track frequency of noncompliant element errors reported in association with specific developer servers; and document the tracked frequency of the noncompliant element errors reported in association with the specific developer servers within logging error reports.

12. The system of claim 8, where the processor is further programmed to:

receive, in response to generation of a report comprising the identified noncompliant element and the run-time correction of the identified noncompliant element, a generated new release of the dynamic web content; and provide the generated new release of the dynamic web content within the application run-time.

13. The system of claim 8, where, in being programmed to perform the run-time correction of the identified noncompliant element within the dynamic web content changed by the dynamic web application to cause the identified noncompliant element to comply with the web content compliance rules, the processor is programmed to:

apply at least one error correction rule based upon an error type associated with the identified noncompliant element associated with the parsed run-time application-generated change by the dynamic web application to the dynamic web content.

14. A computer program product, comprising:

a computer readable storage medium having computer readable program code embodied therewith, where the computer readable program code when executed on a computer causes the computer to:

detect a run-time application-generated change to dynamic web content that is generated during an application run-time by a dynamic web application in response to user run-time interactions with the dynamic web content rendered by the dynamic web application that changed the dynamic web content during the run-time;

parse the detected run-time application-generated change to the dynamic web content;

compare the parsed run-time application-generated change by the dynamic web application to the dynamic web content with web content compliance rules that define specifications for web content representation;

identify a noncompliant element associated with the parsed run-time application-generated change by the dynamic web application to the dynamic web content based upon the comparison with the web content compliance rules; and perform a run-time correction of the identified noncompliant element within the dynamic web content changed by the dynamic web application to cause the identified noncompliant element to comply with the web content compliance rules.

15. The computer program product of claim 14, where the specifications for the web content representation defined within the web content compliance rules comprise a plurality of specifications selected from a group consisting of:

structural, syntactic, formatting, functionality, and accessibility markup language specifications defined for the web content representation.

16. The computer program product of claim 14, where the specifications for the web content representation defined within the web content compliance rules capture attribute associations between elements of the dynamic web content.

17. The computer program product of claim 14, where the computer readable program code when executed on the computer further causes the computer to track frequency of noncompliant element errors reported in association with specific developer servers.

18. The computer program product of claim 17, where the computer readable program code when executed on the computer further causes the computer to document the tracked frequency of the noncompliant element errors reported in association with the specific developer servers within logging error reports.

19. The computer program product of claim 14, where the computer readable program code when executed on the computer further causes the computer to:

receive, in response to generation of a report comprising the identified noncompliant element and the run-time correction of the identified noncompliant element, a generated new release of the dynamic web content; and provide the generated new release of the dynamic web content within the application run-time.

20. The computer program product of claim 14, where, in causing the computer to perform the run-time correction of the identified noncompliant element within the dynamic web content changed by the dynamic web application to cause the identified noncompliant element to comply with the web content compliance rules, the computer readable program code when executed on the computer causes the computer to:

apply at least one error correction rule based upon an error type associated with the identified noncompliant element associated with the parsed run-time application-generated change by the dynamic web application to the dynamic web content.

\* \* \* \* \*